United States Patent Office 3,035,892
Patented May 22, 1962

3,035,892
PROCESS FOR THE PRODUCTION OF SF₅Cl
Hugh Leithead Roberts, Northwich, England, assignor to Imperial Chemical Industries Limited, Millbank, London, England, a corporation of Great Britain
No Drawing. Filed Apr. 16, 1959, Ser. No. 806,771
Claims priority, application Great Britain Apr. 30, 1958
6 Claims. (Cl. 23—14)

This invention relates to a novel compound of sulphur, chlorine and fluorine, and to a process for its manufacture.

Compounds of sulphur and fluorine are known, for example sulphur hexafluoride which is stable and inert, and lower fluorides $SF_4$, $SF_2$ and $S_2F_2$ all of which are hydrolysable though $SF_2$ and $S_2F_2$ are not entirely well-characterised. Likewise compounds of sulphur and chlorine are well-known. Also known are compounds of sulphur, fluorine, chlorine and another non-metal, for example thionyl chlorofluoride SOClF and sulphuryl chlorofluoride $SO_2ClF$, where the other non-metal is oxygen, and others in which it is carbon. Not known hitherto however have been compounds containing only sulphur, chlorine and fluorine, and one such compound namely surphur pentafluoride monochloride, $SF_5Cl$, and a process for making it constitute the principal objects of our invention.

According to our invention we provide sulphur pentafluoride monochloride as a new compound. We also provide a process for making sulphur pentafluoride monochloride comprising reacting sulphur dichloride or sulphur monochloride directly with fluorine at a low temperature and separating sulphur pentafluoride monochloride from the reaction products. Another aspect of the process of our invention is that it provides a novel method of making sulphur tetrafluoride as a by-product.

The reaction between fluorine and sulphur dichloride at a low temperature inherently produces the novel compound sulphur pentafluoride monochloride as indicated by gas-chromotography and infra-red absorption analysis, but chlorine, sulphur tetrafluoride and sulphur hexafluoride are produced at the same time. The presence of appreciable quantities of chlorine and sulphur tetrafluoride in the mixture of reaction products in a roughly one to one molecular ratio suggested at one time that the new compound indicated by gas-chromatography and infra-red absorption analysis of the mixture was sulphur tetrafluoride dichloride $SF_4Cl_2$, but the latter is now considered not to exist in this system.

In the preferred method of carrying out our process fluorine from an electrolytic cell is passed over anhydrous sodium fluoride to remove hydrogen fluoride, and then through a copper spiral immersed in liquid air to remove all traces of moisture, and then together with a dry mixture of nitrogen and sulphur dichloride, which depending on the temperature may be wholly gaseous or liquid and gaseous, into a copper reaction vessel maintained at a low temperature by a suitable refrigerant. A convenient temperature for a wholly gaseous phase reaction is between 0° and −20° C., whilst for a gas/liquid phase reaction lower temperatures within the approximate range of −20° to −80° C. are suitable. If sulphur monochloride is used in place of sulphur dichloride the reaction is preferably carried out at −20° to −80° C.

The substances formed are chlorine, sulphur tetrafluoride, sulphur hexafluoride and sulphur pentafluoride monochloride. Their proportions vary from run to run but roughly one-third is chlorine, one-third sulphur tetrafluoride, and one-third a mixture of sulphur hexafluoride plus sulphur pentafluoride monochloride of which the latter constitutes 90% or more. The yield of sulphur pentafluoride is thus about 30%. One way of separating the various compounds comprises the following steps:

(i) The reaction mixture is treated with boron trifluoride which combines with the sulphur tetrafluoride and removes it as the white solid $BF_3.CF_4$.
(ii) The remaining mixture is treated with acidified ferrous sulphate solution in order to remove chlorine.
(iii) Sulphur pentafluoride monochloride and sulphur hexafluoride which now remain are separated by gas-chromatography using for example a column of a polychlorofluoro carbon $(CF_2CFCl)_n$.

If it is not desired to obtain sulphur tetrafluoride as a by-product step (i) may be omitted and the reaction mixture passed directly into acidified ferrous sulphate solution which will hydrolyse sulphur tetrafluoride. After this, what remains is passed through acidified potassium dichromate solution to remove any sulphur dioxide produced during the hydrolysis of the sulphur tetrafluoride and not absorbed then, and then through a drying agent. After this, only sulphur pentafluoride monochloride and sulphur hexachloride remain and are separated by gas-chromatography.

To obtain sulphur tetrafluoride from the complex compound $BF_3.SF_4$ formed in step (i) the latter is heated to about 80° C., at which temperature it sublimes under atmospheric pressure, and the vapour passed over heated sodium fluoride. Sulphur tetrafluoride and sodium fluoborate are formed in this known reaction and the former being a vapour passes on and may be collected by condensing it at a temperature below −40° C., its boiling point. The whole of the reaction should be carried out in the entire absence of moisture.

*Example 1*

In a typical liquid/gaseous phase experiment, 14.4 gm. sulphur dichloride on fluorination at −80° C. gave 17.7 gm. of mixed products out of which 4.4 gm. of sulphur pentafluoride monochloride was obtained.

Sulphur pentafluoride monochloride has a boiling point of −21° C., a latent heat of evaporation of 4560 kilocals/mole, and a Trouton constant of 18.2. It is a colourless liquid below the boiling point, giving rise to a colourless gas. Analysis by fusion with potassium and estimation of the resulting sulphide, fluoride and chloride of potassium gave

| Sulphur, percent | Fluorine, percent | Chlorine, percent |
|---|---|---|
| 20.1 | 22.4 | 58.2 |
| 20.5 | 21.9 | 57.2 |
| theoretical 19.8 | 21.9 | 58.5 |

The molecular weight determined by Victor Meyer's method was 160.0 (theoretical 162.5).

*Example 2*

In a wholly gaseous phase experiment fluorine at a rate of 18 gm. per hour was mixed with a stream of nitrogen carrying sulphur dichloride vapour at a rate of 14 gm. per hour and the mixed gases were led through a copper spiral cooled to between 0° and −10° C. in a bath of isopropanol which was circulated through a heat exchanger containing solid carbon dioxide. The temperature was controlled by regulating the rate of circulation. The mixture of gases produced in the reaction was passed into a series of traps cooled in liquid air.

After 5 hours, when 90 gm. of fluorine and 70 gm. of sulphur dichloride had passed into the reaction tube, the contents of the liquid air traps, amounting to 176 gm., were volatilised and passed successively through acidified ferrous sulphate solution, acidified potassium dichromate solution, and a drying agent, and again collected in traps cooled in liquid air. At this stage the product consisted of a mixture of sulphur hexafluoride and sulphur pentafluoride monochloride. This mixture was separated by gas-chromatography, collecting the second fraction eluted; 2.6 gm. of pure sulphur pentafluoride monochloride was obtained.

Sulphur pentafluoride monochloride is useful in several fields of chemistry. Thus, when irradiated with light of suitable wave-length it gives rise to free $-SF_5$ radicals which can induce polymerisations of the type initiated by free radicals. For example, when irradiated with ultra-violet light in the presence of tetrafluoroethylene it can lead, depending on the relative proportions of the latter, to the formation of polytetrafluoroethylene or to copolymers consisting essentially of tetrafluoroethylene and sulphur tetrafluoride. It can also be used as an intermediate in the production of fluorine-containing compounds.

What I claim is:

1. A process for making sulphur pentafluoride monochloride comprising combining fluorine with a compound selected from the group consisting of sulphur dichloride and sulfur monochloride at a temperature between 0° and −80° C. and under anhydrous conditions and separating sulphur pentafluoride monochloride from the other reaction products, chlorine, sulphur tetrafluoride and sulphur hexafluoride.

2. A process for making sulphur pentafluoride monochloride as set forth in claim 1 in which said compound is sulphur dichloride and the reaction temperature is between −20° and −80° C.

3. A process for making sulphur pentafluoride monochloride as set forth in claim 1 in which said compound is sulphur dichloride and the reaction temperature is between 0° and −20° C.

4. A process for making sulphur pentafluoride monochloride as set forth in claim 1 in which said compound is sulphur monochloride and the reaction temperature is between −20° and −80° C.

5. A process as set forth in claim 1 in which sulphur pentafluoride monochloride is separated from the reaction mixture by treating the mixture with boron trifluoride to remove sulphur tetrafluoride as a complex compound, then with acidified ferrous sulphate solution to remove chlorine, the remaining mixture being subjected to gas-chromatography to remove sulphur hexafluoride.

6. A process as set forth in claim 1 in which the reaction mixture is passed through acidified ferrous sulphate solution to remove chlorine and sulphur tetrafluoride, then through acidified potassium dichromate solution to remove sulphur dioxide, the remaining mixture being dried and subjected to gas-chromatography to remove sulphur hexafluoride.

References Cited in the file of this patent

Mellor: "Comprehensive Treatise on Inorganic and Theoretical Chemistry," 1956, Supplement II, part I, page 58.

Bartlett et al.: "Chemistry and Industry," pages 1351–1352 (November 17, 1956).